United States Patent [19]
Spink

[11] 3,824,444
[45] July 16, 1974

[54] CONTROLLED RECTIFIER SYSTEMS AND FLEXIBLE GATE PULSE CONTROL CIRCUITS THEREFOR

[75] Inventor: Robert W. Spink, Wauwatosa, Wis.

[73] Assignee: Cutler-Hammer, Inc., MIlwaukee, Wis.

[22] Filed: July 5, 1973

[21] Appl. No.: 376,913

[52] U.S. Cl. .................................................. 321/5
[51] Int. Cl. ........................................... H02m 7/20
[58] Field of Search .................................. 321/5, 40

[56] References Cited
UNITED STATES PATENTS

| | | | |
|---|---|---|---|
| 3,351,838 | 11/1967 | Hunter | 321/5 |
| 3,469,170 | 9/1969 | Gyugyi | 321/5 |
| 3,517,296 | 6/1970 | Kuhn | 321/5 |
| 3,707,669 | 12/1972 | Kanngiesser et al. | 321/5 |
| 3,746,965 | 7/1973 | Okada et al. | 321/5 |
| 3,771,041 | 11/1973 | Chadwick | 321/5 |

*Primary Examiner*—William M. Shoop, Jr.
*Attorney, Agent, or Firm*—Hugh R. Rather; Wm. A. Autio

[57] ABSTRACT

A plurality of different controlled rectifier systems for D.C. motor control using flexible gate control circuits. Three like gate control circuits are adapted to be mounted on each printed circuit card. Each gate control circuit is universal in character and is provided with external terminals whereby it can be connected for different applications such as semi-converter, half-wave reversing, full-wave system, and the like. This gate control circuit includes control signal integration where the control signal shapes the ramp and a pulse is generated after a fixed energy accummulation. This flexible gate control circuit is provided with a novel ramp stretch circuit that can be rendered effective by jumpering external terminals. Provision is also made for connecting to external terminals an external ramp stretch circuit of a different time constant. The invention affords a single design of gate control circuit adapted for use in a plurality of different silicon controlled rectifier systems so that all are insensitive to line phase rotation.

11 Claims, 10 Drawing Figures

CONTROLLED RECTIFIER SYSTEMS AND FLEXIBLE GATE PULSE CONTROL CIRCUITS THEREFOR

BACKGROUND OF THE INVENTION

Controlled rectifier systems supplied from a three-phase alternating current source for energizing a load device such as a D.C. motor have been known heretofore. P. M. Fischer U.S. Pat. No. 2,986,692, dated May 30, 1961, shows a full-wave controlled rectifier system of that type. My prior U.S. Pats. Re. 26,701, dated Oct. 28, 1969, and Re. 26,708 dated Nov. 4, 1969, show a semi-converter controlled rectifier system.

While these prior systems have been useful for their intended purposes, they have had the disadvantage that the SCR firing circuits or gating circuits were designed for each particular system and had no flexibility for use in more than one different system.

This invention relates to improvements thereover.

SUMMARY OF THE INVENTION

This invention relates to controlled rectifier systems and to flexible gate control circuits therefor.

An object of the invention is to provide improved controlled rectifier systems.

A more specific object of the invention is to provide an improved flexible gate control circuit usable in a plurality of different controlled rectifier systems all insensitive to line phase rotation.

Another object of the invention is to provide an improved gate control circuit incorporating the combination of control signal integration where the control signal shapes the ramp and a pulse is generated after a fixed energy accumulation, insensitivity to line phase rotation, and flexibility for use in a plurality of different controlled rectifier systems.

Another specific object of the invention is to provide flexible gate control circuits having external terminals whereby they may be connected into different applications for controlling different controlled rectifier systems.

Another specific object of the invention is to provide a flexible gate control circuit with an improved ramp stretch circuit for gate phase control.

Another specific object of the invention is to provide a flexible gate control circuit of the aforementioned type with an optional external ramp stretch circuit having a longer time constant than its internal ramp control circuit.

Other objects and advantages of the invention will hereinafter appear.

DESCRIPTION OF THE PREFERRED EMBODIMENTS

SEMI-CONVERTER - FIG. 1

Figure 1:
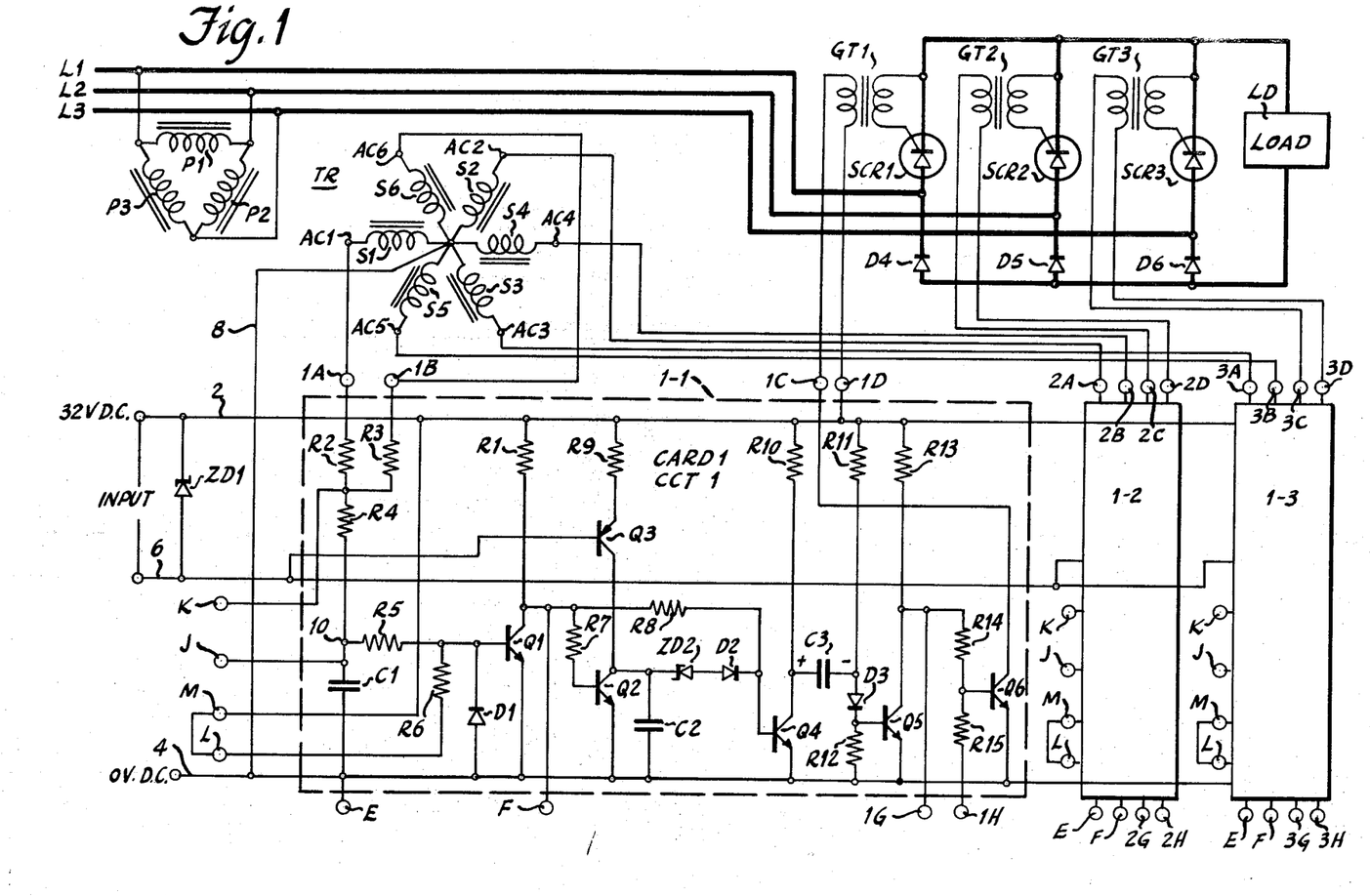
FIG. 1 is a circuit diagram showing a semi-converter, controlled rectifier system including three like gate control circuits for controlling the respective SCR's of the rectifier network along with the details of the first gate pulse control circuit.

Referring to FIG. 1, there is shown a semi-converter type controlled rectifier system constructed in accordance with the invention. This semi-conductor system is provided with three silicon controlled rectifiers SCR1, SCR2 and SCR3 and three diodes D4, D5 and D6. The three SCR's are arranged to conduct currents from power supply lines L1, L2 and L3, respectively, to a load LD and the three diodes from return current paths from the load to power supply lines L1, L2 and L3, respectively. The three power supply lines are adapted to be connected to a three-phase alternating current power source.

An alternative semi-converter system arrangement has the positions of the SCR's and diodes interchanged so that the SCR's conduct currents from the load to the respective power lines and the diodes form current paths from the respective power lines to the load.

One reason for determining the semi-conductor arrangement used is the number of heat sinks desired. High power systems require more heat sinks since more heat is generated. SCR's are mounted to the heat sink by the anodes. Diodes are available for mounting to heat sinks by either anodes or cathodes. Thus, the arrangement shown in FIG. 1 provides for three heat sinks, one between each SCR-diode pair. On the other hand, the alternative semi-converter system arrangement described above provides for two heat sinks, one at the anodes of the three SCR's and another at the cathodes of the three diodes.

Figure 4:
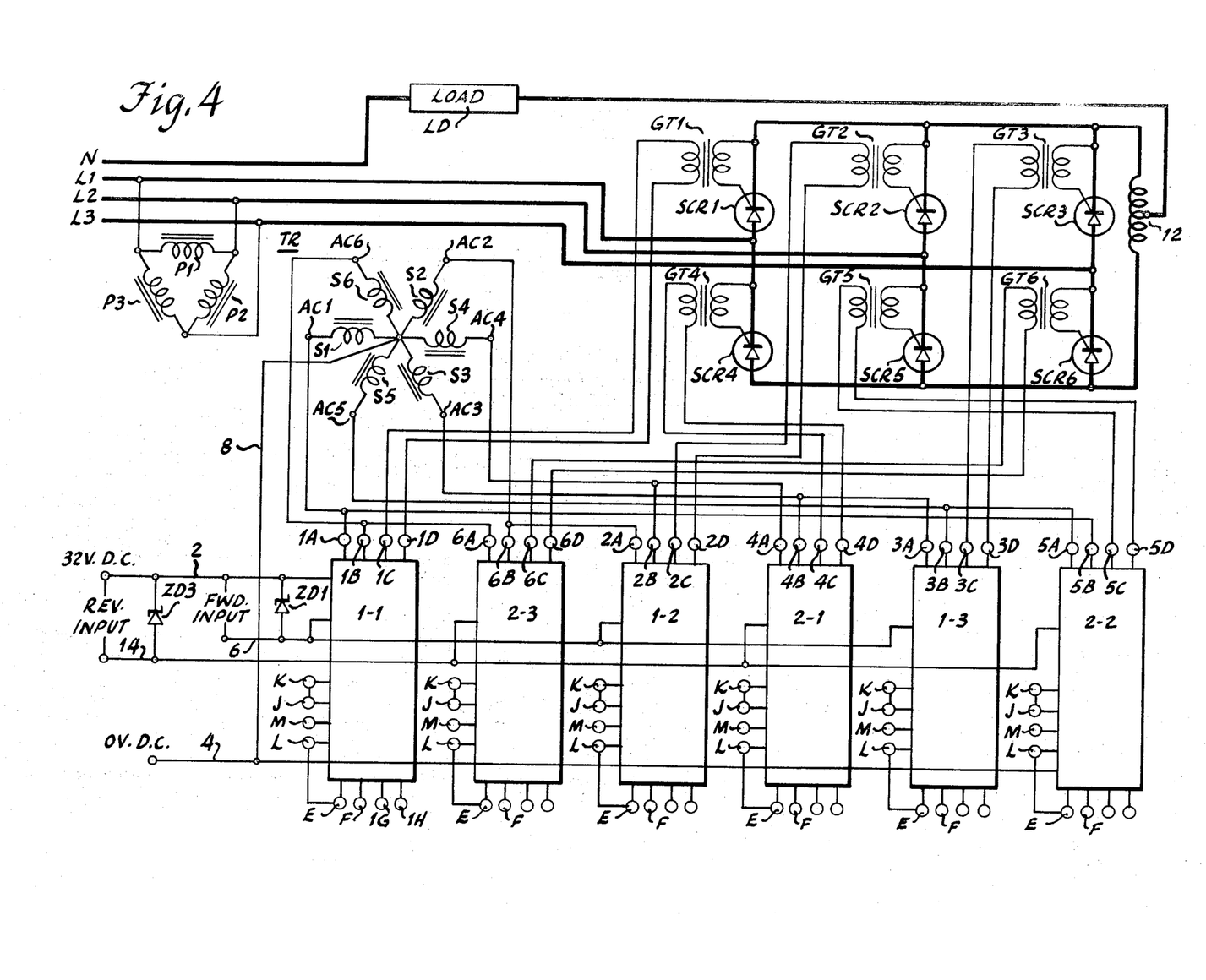
FIG. 4 is a circuit diagram showing a half-wave reversing controlled rectifier system using six of the flexible gate control circuits.
Figure 6:
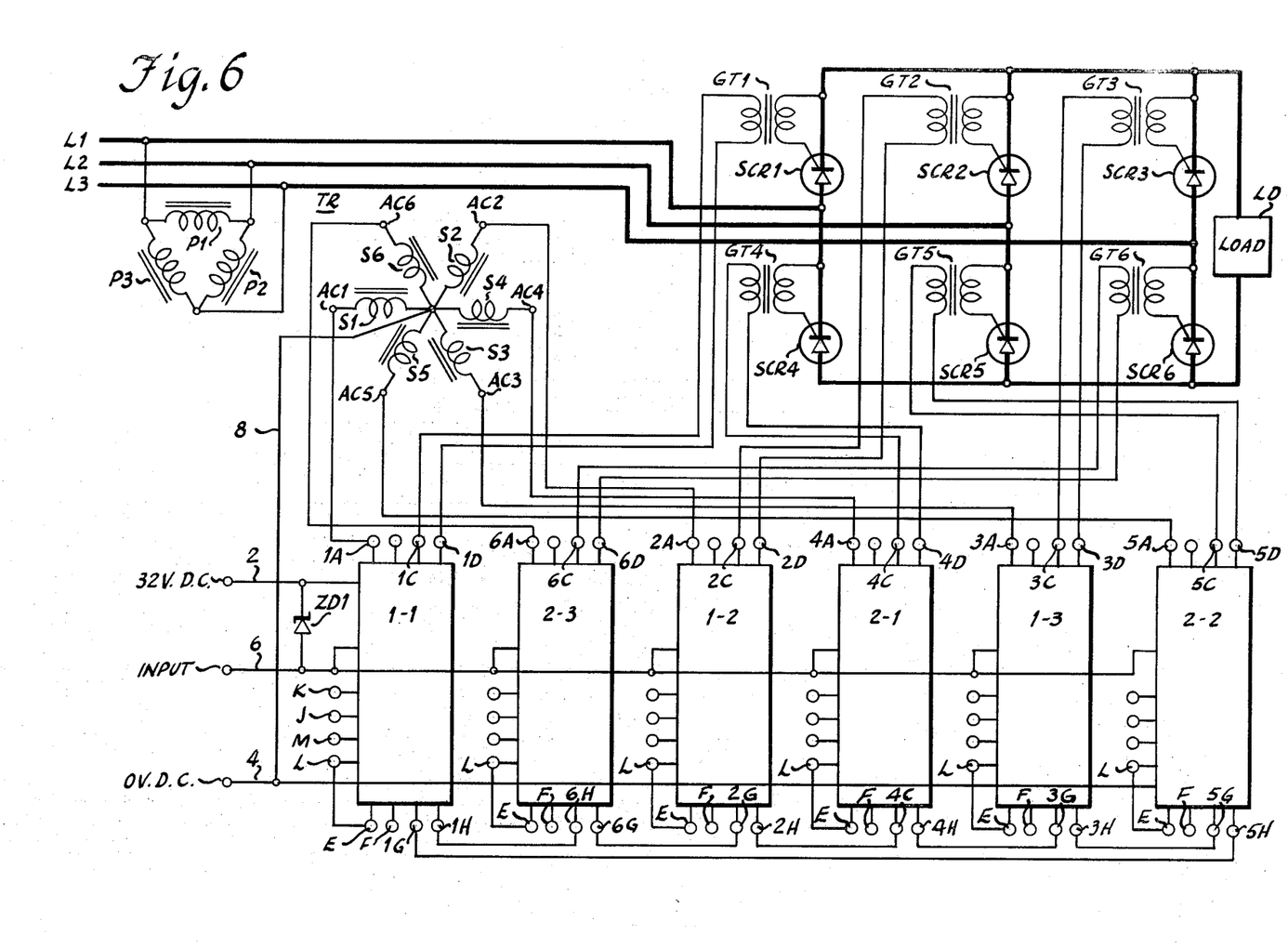
FIG. 6 is a circuit diagram showing a full-wave controlled rectifier system using six of the flexible gate control circuits.

The three SCR's are controlled by the three gate control circuits 1—1, 1-2 and 1-3, respectively. These three circuits are alike and three such circuits are mounted on one printed circuit (PC) board or card. The three circuits on each card are numbered −1, −2 and −3 and the prefix −1 indicates that they are mounted on the first PC card. A second set of three gate control circuits will be numbered 2-1, 2-2 and 3-3 indicating by the prefix the second PC card as shown in FIGS. 4 and 6.

In FIG. 1, gate control circuit 1-1 is shown in detail and gate control circuits 1-2 and 1-3 are shown in block form to avoid complicating the drawing since they are similar to circuit 1-1. This gate control circuit has the flexibility of being usable in various systems such as those shown in FIGS. 1, 4 and 6 and is universal in application therefor. For this reason, the terminals are shown outside the blocks to afford indication of the different connections and jumpers for the various applications of the universal circuit. The load device LD in the systems shown in FIGS. 1, 4 and 6 is typically a direct current electric motor.

As shown in FIG. 1, gate control circuits 1-1, 1-2 and 1-3 are powered from a 32 volt D.C. source across conductors 2 and 4, receive an input signal across conductors 2 and 6, and are provided with A.C. control signals from power supply lines L1, L2 and L3 through a transformer TR having primary windings P1-3 and secondary windings S1-6. As shown in FIG. 1, primary windings P1-3 are connected between power lines L1-L2, L2-L3 and L3-L1, respectively. Secondary windings S1-6 are connected at one end to a common point which is connected through conductor 8 to the common or zero voltage side of the D.C. power supply at conductor 4. The other end of secondary windings S1 and S6 are connected to terminals 1A and 1B, respectively, of gate control circuit 1-1. In a similar manner, the other ends of secondary windings S2 and S4 are connected to terminals 2A and 2B, respectively, of circuit 1-2. And the other ends of secondary windings S3 and S5 are connected to terminals 3A and 3B, respectively, of circuit 1-3. In this manner, phases AC1 and AC6 are applied to circuit 1-1, phases AC2 and AC4 are applied to circuit 1-2, and phases A3 and A5 are applied to circuit 1-3 to synchronize the gate pulses of the SCR's to the periods when their anodes are receiving positive voltage from the power supply lines.

A zener diode ZD1 is connected across conductors 2 and 6 to limit the input signal voltage.

As shown in FIG. 1, gate control circuit 1-1 comprises a sync circuit for synchronizing the gate pulse with the positive anode voltage period of the associated SCR1. This sync circuit comprises an N-P-N transistor Q1 having its collector supplied with positive voltage from conductor 2 through a load resistor R1 and having its emitter connected to common conductor 4. The base of transistor Q1 is supplied with a sync voltage as follows. AC terminals 1A and 1B are connected through respective resistors R2 and R3 to a junction which then is connected through a sync calibrating resistor R4 and a charging capacitor C1 to common conductor 4. The junction 10 between resistor R4 and capacitor C1 is connected through a current limiting resistor R5 to the base of transistor Q1. A diode D1 is connected in its forward, low impedance direction from common conductor 4 to the base of transistor Q1 to shunt any reverse voltage from the base-emitter circuit of the transistor.

External terminal E is connected to common conductor 4 and external terminal F is connected to the collector of transistor Q1 to afford connection of an external ramp stretch circuit thereto as hereinafter described in connection with FIG. 8.

External terminals J and K are connected across sync calibrating resistor R4 to shunt this resistor when a jumper is connected therebetween as hereinafter described in connection with the half-wave reversing system of FIG. 4.

External terminals L and M are adapted to connect positive voltage conductor 2 through a current limiting resistor R6 to the base of transistor Q1 when a jumper is connected therebetween to apply a bias voltage thereto for ramp stretch purposes as hereinafter described in connection with FIG. 2.

Furthermore in this sync circuit, the collector of transistor Q1 is connected through a current limiting resistor R7 to the base of N-P-N transistor Q2. The emitter of transistor Q2 is connected to common conductor 4 and its collector is connected to the integrating phase shift circuit next described. The collector of transistor Q1 is also connected through a current limiting resistor R8 to the base of a gate pulse control N-P-N transistor Q4 for purposes hereinafter described.

The aforesaid integrating phase shift circuit comprises an input P-N-P transistor Q3 controlled by the input signal. For this purpose, input conductor 6 is connected to the base of this transistor. Its emitter is supplied with voltage from positive voltage conductor 2 through resistor R9 and its collector is connected through a charging capacitor C2 to common conductor 4. The collector of the aforesaid transistor Q2 is connected to the junction between capacitor C2 and the collector of input transistor Q3 whereby transistor Q2 shunts ramp capacitor C2 except when charging is to take place.

The aforesaid phase shift circuit also comprises a zener diode ZD2 and a unidirectional diode D2 connected in series from the upper side of capacitor C2 to the base of transistor Q4. This zener diode serves as a trigger device to develop a gate pulse and the unidirectional diode blocks resistor R8 current from being shunted to the zener diode so that it goes only to the base of transistor Q4.

The gate pulseforming circuit comprises N-P-N transistors Q4, Q5 and Q6. Positive voltage is supplied from conductor 2 through a current limiting resistor R10 to the collector of transistor Q4 while its emitter is connected to common conductor 4. Turn-on bias voltage is supplied from conductor 2 through current limiting resistor R11 and diode D3 to the base of transistor Q5, there being a current by-pass resistor R12 connected from the base of transistor Q5 to common conductor 4. A pulse forming capacitor C3 is connected from the collector of transistor Q4 to the anode of diode D3.

Transistor Q5 is supplied with positive voltage from conductor 2 through resistor R13 to its collector while its emitter is connected to common conductor 4. The collector of transistor Q5 is connected through the current limiting resistor R14 to the base of transistor Q6. The emitter of transistor Q6 is connected to common conductor 4 while its collector is connected to external terminal 1C. External terminal 1D is connected to positive voltage supply conductor 2. These gate pulse terminals 1C and 1D are connected to the primary winding of gate transformer GT1 so that when transistor Q6 is turned on, a gate pulse is transmitted from its secondary winding across the gate-cathode junction of SCR1.

The collector of transistor Q5 is also connected to external terminal 1G which is a "pulse" terminal. External terminal 1H which is a "refire" terminal is connected through a current limiting resistor R15 to the base of transistor Q6. As will be apparent, pulse terminal 1G may be connected to a refire terminal such as 5H in FIG. 6 of another gate pulse control circuit for refiring another SCR to prevent commutation failure and resulting malfunction as hereinafter described in connection with the fullwave system of FIG. 6.

In a similar manner, as described in connection with gate control circuit 1—1, gate control circuits 1-2 and 1-3 receive D.C. supply voltage from conductors 2 and 4 as shown schematically in FIG. 1, and the control signal is applied from conductor 6 thereto. These two circuits are also each provided with external terminals E and F for external ramp stretch circuit connection, sync calibrate terminals J and K and ramp stretch terminals L and M that may be jumpered as hereinafter described. Also, these two circuits are provided with A.C. signal terminals 2A-2B and 3A-3B, gate pulse output terminals 2C-2D and 3C-3D and pairs of pulse and refire external terminals 2G-2H and 3G-3H for purposes hereinbefore described. Thus, the single design of gate control circuit can be used for a variety of applications merely by making connections to appropriate external terminals.

GATE CONTROL CIRCUIT OPERATION

The operation of gate control circuit 1—1 shown in FIG. 1 will now be described with reference to the curves in FIG. 2.

Initially, transistors Q2, Q4 and Q5 are biased on. For this purpose, current flows from positive voltage conductor 2 through resistors R1 and R7 and the base-emitter junction of transistor Q2 to common conductor 4 to bias transistor Q2 on whereby to discharge capacitor C2 of any voltage that might appear thereon. Current also flows from conductor 2 through resistors R1 and R8 and the base-emitter junction of transistor Q4 to bias the latter on. As a result, current flows from conductor 2 through resistor R10 and the collector-emitter junction of transistor Q4 to common conductor 4. Current also flows from conductor 2 through resistor R11, diode D3 and resistor R12 to common conductor 4. The voltage drop across resistor R12 causes current flow through the base-emitter junction of transistor Q5 to turn it on. As a result, current flows from conductor 2 through resistor R10 and the collector-emitter junction of transistor Q4 to common conductor 4. Current also flows from conductor 2 through resistor R11, diode D3 and resistor R12 to common conductor 4. The voltage drop across resistor R12 causes current flow through the base-emitter junction of transistor Q5 to turn it on. As a result, current flows from conductor 2 through resistor R13 and the collector-emitter junction of transistor Q5 to common conductor 4. The near zero voltage at the collector of transistor Q5 is applied through resistor R14 to the base of transistor Q6 to hold it turned off and is also applied to external pulse terminal 1G.

Upon application of an input control signal to conductor 6, transistor Q3 turns on. This input signal has a magnitude lower than the supply voltage on conductor 2 and is applied from conductor 6 to the base of transistor Q3. This causes current flow from conductor 2 through resistor R9 and the emitter-base junction of transistor Q3 to turn it on an amount proportional to the magnitude of the input signal voltage. Zener diode ZD1 limits the input signal that can be applied to the base of transistor Q3. As a result, current flows from conductor 2 through resistor R9, the emitter-collector junction of transistor Q3 and the collector-emitter junction of transistor Q2 to common conductor 2. Capacitor C2 does not charge because it is being shunted by transistor Q2.

The time when the input signal becomes effective to charge capacitor C2 and operate this gate control circuit is determined by the synchronizing A.C. signal applied thereto from transformer TR. This synchronization is arranged so that the gate pulse will be applied to SCR1 during the electrical period when positive voltage is being applied from power supply line L1 to the anode of SCR1, and so that the power lines may be connected to the source in any order without affecting this sync. A phase AC1 sync signal is applied to external terminal 1A in the full-wave system of FIG. 6 or phases AC1 and AC6 sync signals are applied to external terminals 1A and 1B in the semi-converter and half-wave reversing systems of FIGS. 1 and 4 for these purposes.

Figure 2:
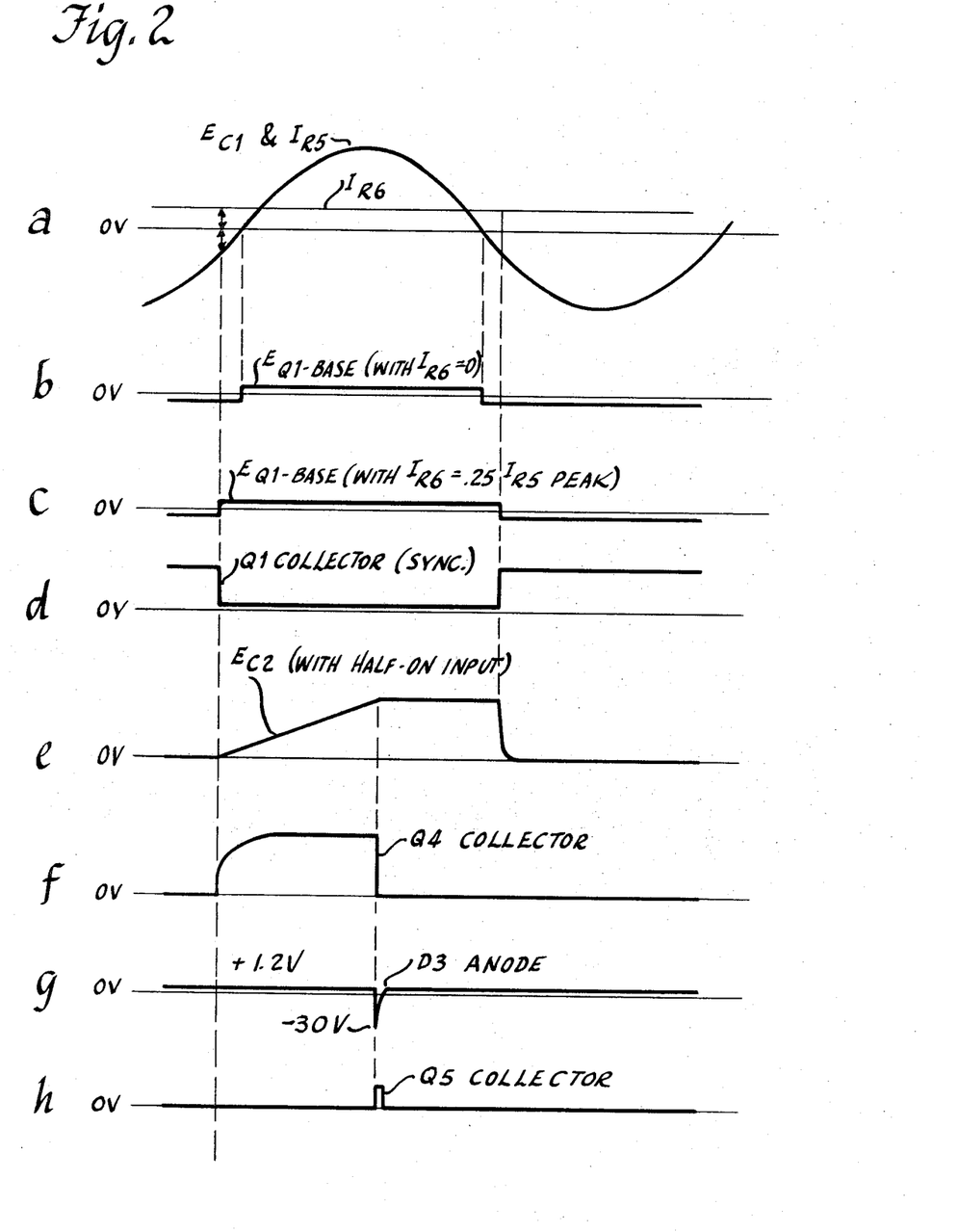
FIG. 2 is a group of curves showing operating characteristics of the flexible gate control circuit shown in detail in FIG. 1.

The result of the sync signal or signals is shown in FIG. 2, curve (a). Thus, current flow through resistor R2 or resistors R2 and R3 and then through resistor R4 and capacitor C1 produces a voltage $E_{c1}$ on the upper side of this capacitor at junction 10 to appear as shown in FIG. 2a, assuming that the jumper between sync calibrate terminals J and K is not connected. As can be seen, this is an A.C. wave.

If the jumper is not connected across ramp stretch terminals L and M, the result is shown in curve (b), FIG. 2. When this capacitor voltage $E_{cl}$ has an initial negative value, current flows up through diode D1, and the voltage drop thereacross causes a negative voltage of about 0.6 to appear on the base of transistor Q1 to keep the latter turned off. When the capacitor voltage $E_{cl}$ rises above zero value, current flows through resistor R5 and the base-emitter junction of transistor Q1 to common conductor 4. This current $I_{R5}$ flowing in resistor R5 may also be represented by the wave in curve (a), FIG. 2. This causes the transistor Q1 base voltage $E_{Q1}$-base to shift from minus 0.6 volts to plus 0.6 volts as this transistor turns on as shown in curve (b). This allows capacitor C2 to start charging as hereinafter described. This voltage goes negative again at the end of the positive half-cycle, FIG. 2, curves (a) and (b).

For ramp stretch purposes, an on-bias may be applied to transistor Q1. The "ramp" is the inclined charging curve of capacitor C2 as shown in curve (e), FIG. 2. For this purpose, the jumper is connected across ramp stretch terminals L and M as shown in FIG. 1. The result is shown in curve (c). Thus, current flows from conductor 2 through resistor R6 and the base-emitter junction of transistor Q1 to bias this transistor on a selected amount. This current $I_{R6}$ is shown in curves (a). As a result, transistor Q1 turns on sooner when the algebraic sum of the currents in resistors R5 and R6 passes through zero to positive as shown by curve (c). Also transistor Q1 conducts longer as it does not turn off until the algebraic sum of these voltages passes through zero to negative. Thus, both ends are stretched.

This lengthened conduction period of transistor Q1 controls the charging of capacitor C2. Thus, when transistor Q1 turns on, its collector voltage drops to a low value near zero as shown by curve (d) in FIG. 2 and remains at this low value until this transistor turns off again. At this low value, transistor Q1 shunts the bases of transistors Q2 and Q4 to cause them to turn off.

When transistor Q2 turns off, it unshunts capacitor C2 allowing it to start charging by current flow through resistor R9 and input control transistor Q3. The charging rate is determined by the magnitude of the input signal applied to the base of transistor Q3. Capacitor C2 will charge and the voltage $E_{c2}$ will increase as shown by "ramp" curve (e) in FIG. 2.

When transistor Q4 turns off as aforesaid, current will flow through resistor R10, capacitor C3, diode D3 and the base-emitter junction of transistor Q5. This charges pulse-forming capacitor C3 positive on its left side and negative on its right side as shown in FIG. 1 and curve (f) of FIG. 2 to condition it for its pulsing SCR1.

When capacitor C2 charges to a predetermined value, it triggers zener diode ZD2 to turn transistor Q4 on. This causes the voltage at the left side of capacitor C3 to drop to near zero value as shown by curve (f) in FIG. 2. Since this capacitor cannot discharge instantaneously, the voltage at its right side drops to a negative value as shown by curve (g) in FIG. 2. Thus, the voltage on the anode of diode D3 drops down momentarily to about minus 30 volts from which it increases back to about 1.2 volts (voltage drop on diode D3 plus the voltage drop on the base-emitter junction of transistor Q5) as capacitor C3 discharges. This negative voltage pulse on the anode of diode D3 shown in FIG. 2, curve (g), turns transistor Q5 off for a short time causing the collector voltage thereof to rise to a positive value as shown in curve (h). In other words, the collector of transistor Q5 puts out a positive pluse under the control of pulsing capacitor C3.

This positive pulse is applied through resistor R14 to the base of transistor Q6 to turn the latter on for the duration of this pulse. As a result, a pulse of current flows from positive conductor 2 through external terminal 1D, primary of gate transformer GT1, external terminal 1C and the collector-emitter junction of transistor Q6 to common conductor 4. As a result, a current pulse is applied from the secondary of this gate transformer to the gate of SCR1 to fire it into conduction. SCR1 will then conduct for the remainder of its positive anode voltage period as hereinafter described in connection with the semi-converter system of FIG. 1 with reference to the curves in FIG. 3.

The gate control circuit is arranged to generate a "marker" or "back-stop" pulse at the end of the gate control range whenever a gating pulse is not developed as when the input signal is too small to charge capacitor C2 to the zener trigger value. This marker pulse prevents communication failure and resulting malfunction under conditions hereinafter described.

For this purpose, reference is made to FIG. 2. It will be seen that if ramp curve (e) does not rise to zener triggering value, as shown by the broken lines in FIGS. 5 and 7, curves (d), transistor Q4 in FIG. 1 will remain off. At the end of the normal ramp time, transistor Q1 will switch off as shown by curves (c) and (d) in FIG. 2. This causes transistors Q2 and Q4 to be biased back on by current through resistor R1 and branching through resistors R7 and R8. Transistor Q2 discharges capacitor C2. Transistor Q4 collector voltage drops to develop a marker pulse that is applied to the SCR1 gate. If a gating pulse has been generated, capacitor C3 will be in a discharged condition at the end of the normal ramp time so that a marker pulse will not be developed and is not needed.

SEMI-CONVERTER SYSTEM OPERATION

Referring to FIG. 1, three-phase A.C. voltage is applied to power supply lines L1, L2 and L3. This three-phase voltage is illustrated in curves (a), FIG. 3. The relation of the transformer TR secondary phases that are applied to the firing circuits with respect to the SCR anode phases is as follows:

| LINE PHASE | SCR | TR SEC. PHASE | GATE CIRCUIT |
| --- | --- | --- | --- |
| L1-L2 | SCR1 | AC1 | 1-1 |
| L1-L3 | SCR1 | AC6 | 1-1 |
| L2-L3 | SCR2 | AC2 | 1-2 |
| L2-L1 | SCR2 | AC4 | 1-2 |
| L3-L1 | SCR3 | AC3 | 1-3 |
| L3-L2 | SCR3 | AC5 | 1-3 |

Figure 10:
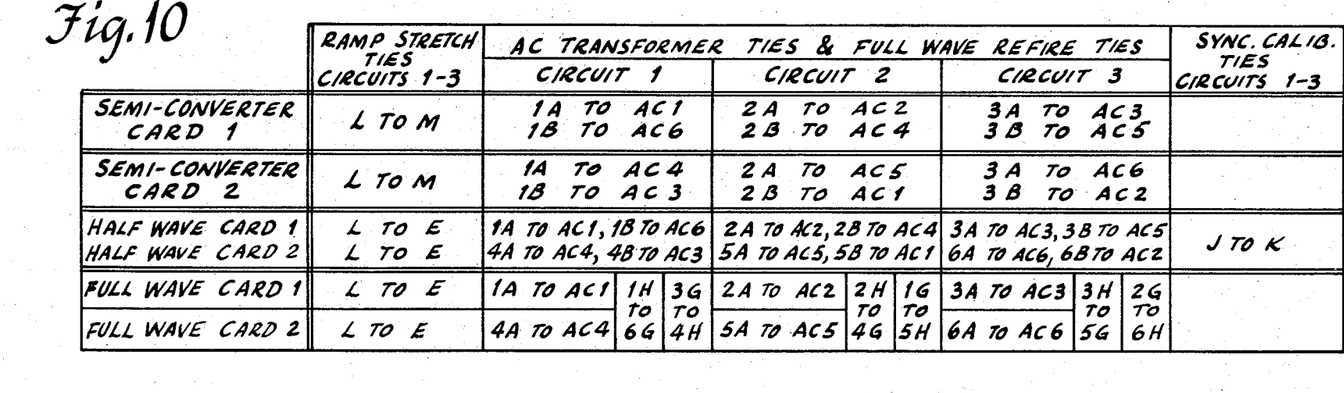
FIG. 10 is a table showing the jumper connections, sync voltage connections, and refire connections of the several systems of FIGS. 1, 4 and 6.

The table in FIG. 10 shows what connections are to be made to the gate control circuits. For semi-converter use as in FIG. 1, the connections are shown in the first horizontal row in this table. As shown herein, a ramp stretch tie or jumper connects external terminals L and M. This ramp stretch jumper is connected because the semi-converter system requires the whole 180 degree control range indicated by arrows below curves (a) in FIG. 3.

As shown in the FIG. 10 table, sync terminals 1A and 1B of the first gate pulse control circuit receive phases AC1 and AC6, 2A and 2B of the second gate circuit receive phases AC2 and AC4, and 3A and 3B of the third gate circuit receive phases AC3 and AC5, respectively. Also, as shown in FIG. 1, output pulses are applied from the first gate circuit 1—1 to the gate of SCR1. Output pulses from the second gate circuit 1-2 are applied to the gate of SCR2, and output pulses from the third gate circuit 1-3 are applied to the gate of SCR3.

Figure 3:
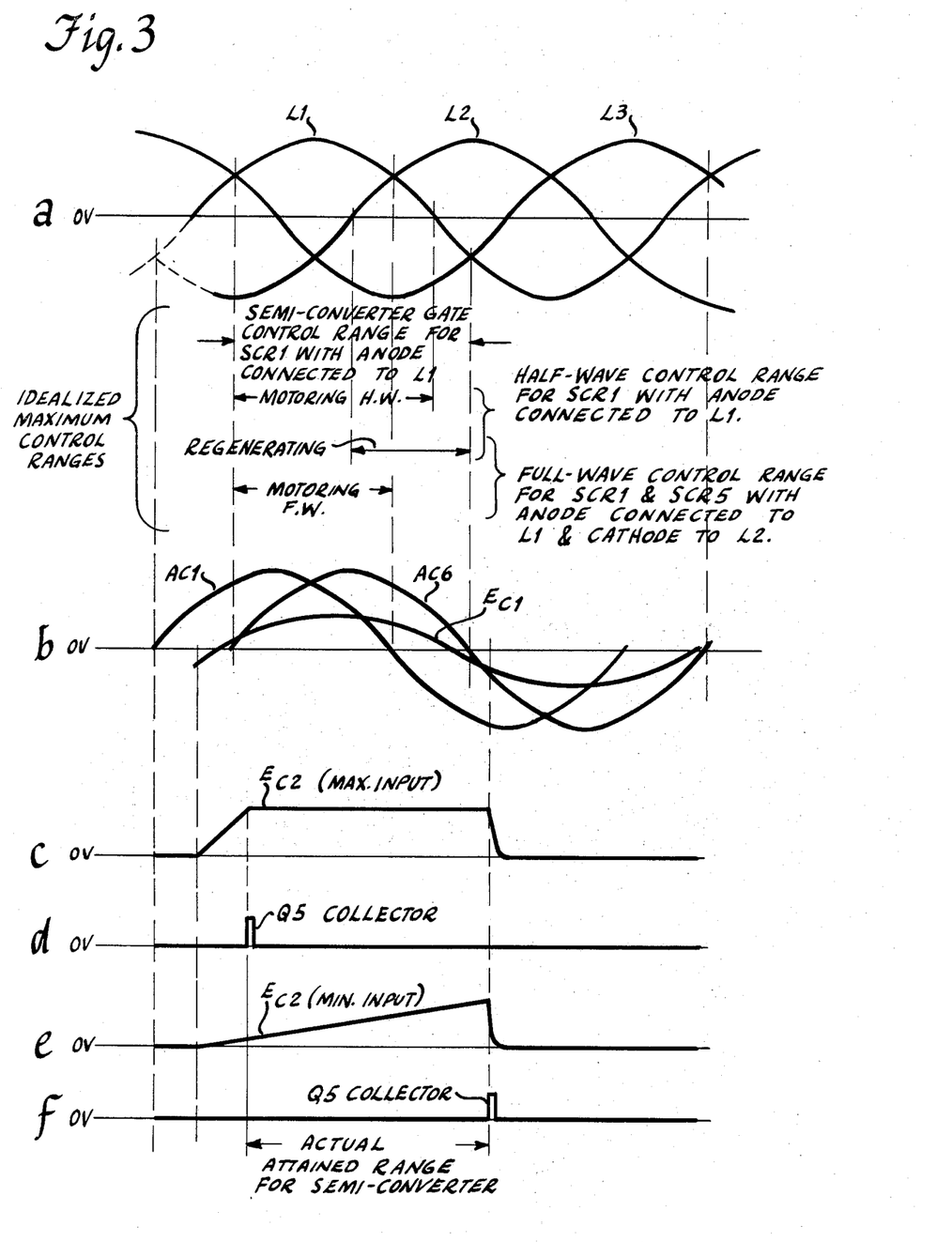
FIG. 3 is a group of curves showing operating characteristics of the semi-converter system of FIG. 1.

The sync voltage $E_c1$ shown in curves (b) in FIG. 3 is obtained as follows. In FIG. 1, equal value resistors R2 and R3 are connected in series between 60° displaced A.C. voltages AC1 and AC6, shown in curves (b) in FIG. 3, to provide an equivalent intermediate phase voltage of 0.866 amplitude of the average of the two voltages. When this internediate phase voltage is applied to the RC circuit of capacitor C1 in FIG. 1, a phase lag is provided to arrive at a voltage $E_{c1}$ shown by curve $E_{c1}$ in FIG. 3, curves (b).

Curves (c) and (d) show the function of the gate pulse control circuit at maximum input signal value. As shown by curve (c), capacitor C2 charges quickly to raise voltage $E_{c2}$ to the zener trigger value whereupon the collector of transistor Q5 puts out a positive gating control pulse for SCR1 as shown by curve (d). The SCR then conducts for the remainder of its positive anode voltage period.

Curves (e) and (f) show the function of the gate pulse control circuit at minimum input signal value. As shown by curve (e), capacitor C2 takes a long time to charge before voltage $E_{c2}$ reaches the zener diode trigger value. However, when it does reach this value, the collector of transistor Q5 puts out a positive gating control pulse to the SCR as shown by curve (f). The distance between the pulses in curves (d) and (f) is the actual attained phase shift range for the SCR firing pulses for the semi-converter system. As can be seen by comparing this actual range with the idealized range indicated below curve (a), the gate control circuits afford almost the entire 180° control range all the way down to zero speed when this semi-converter system is used for motor control.

In a similar manner, gate control circuit 1-2 is controlled by phases AC2 and AC4 and the input signal to pulse the gate of SCR2 through transformer GT2 while its anode is receiving positive voltage from line L2. And gate control circuit 1-3 is controlled in its turn by phases AC3 and AC5 and the same input signal to fire the gate of SCR3 through transformer GT3 while its anode is receiving positive voltage from line L3.

The second row in FIG. 10 shows the connections that are required in the alternate semi-converter system hereinbefore described wherein the positions of the SCR's and the diodes are interchanged. It will be apparent that the ramp stretch jumper is similarly used to connect external terminals L and M, but the phasing of the sync signal is different so as to get the correct sync while the anodes of the SCR's receive positive voltages from the lines.

HALF-WAVE REVERSING SYSTEM - FIG. 4

Referring to FIG. 4, there is shown a half-wave reversing type controlled rectifier system constructed in accordance with the invention and using six of the flexible gate control circuits hereinbefore described with the three circuits mounted on the first card being numbered 1—1, 1-2 and 1-3, and the three circuits mounted on the second card being numbered 2-1, 2—2 and 2-3.

In this half-wave reversing system, power lines L1, L2 and L3, having a three-phase source connected thereto, are connected through forward control SCR1, SCR2 and SCR3, respectively, to one end of a reactor 12. Reference characters like those in FIG. 1 are used herein for similar elements. The other end of reactor 12 is connected through reverse control SCR4, SCR5 and SCR6 to power lines L1, L2 and L3, respectively. The center tap of reactor 12 is connected through a load LD which may be a D.C. motor to neutral N of the power source. Reactor 12 is a conventional bridge-separating reactor such as a center-tapped choke that permits circulating current to reduce the fault level. Because of marker pulse gating of the reverse bridge also carries current but subtracts it from the current in the forward bridge SCR's to reduce the total current in the motor armature. This current would be limited only by the impedance of the transformer and would approach fault values without the added impedance of the reactor. Retarding this marker pulse by external ramp stretch means, shown in FIG. 8 as hereinafter described, reduces the reverse bridge current to zero, and there will be no fault current if the reactor is omitted.

As in FIG. 1, transformer TR has its primary connected to the power lines and has six secondary windings S1-6 providing sync phaes AC1-6. As shown in FIG. 4, phases AC1 and AC6 are connected to sync terminals 1A and 1B of gate control circuit 1—1 and output terminals 1C and 1D thereof are connected through gate transformer GT1 and SCR1. Phases AC2 and AC4 are connected to sync terminals 2A and 2B of gate control circuit 1-2 and output terminals 2C and 2D thereof are connected through gate transformer GT2 to SCR2. And phases AC3 and AC5 are connected to sync terminals 3A and 3B of gate control circuit 1-3 while output terminals 3C and 3D thereof are connected through gate transformer GT3 to SCR3. It will be apparent that these are the three gate control circuits mounted on card 1 and are connected to the sync phases and the three SCR's the same as in FIG. 1.

For reverse operation of the motor, both the sync phases and the SCR anode phases are reversed with respect to the phases used for forward operation as described above. For example, the phases used with respect to SCR4 will be reversed or 180° phase difference relative to the phases used with respect to SCR1. Thus, phases AC4 and AC3 are connected to sync terminals 4A and 4B of gate control circuit 2-1 (card 2, circuit 1) while output terminals 4C and 4D thereof are connected through gate transformer GT4 to SCR4. Phases AC5 and AC1 are connected to sync terminals 5A and 5B of gate control circuit 2—2 while output terminals 5C and 5D thereof are connected through gate transformer GT5 to SCR5. And phases AC6 and AC2 are connected to sync terminals 6A and 6B of gate control circuit 2-3 while output terminals 6C and 6D thereof are connected through gate transformer GT6 to SCR6.

As shown in FIG. 4, the three forward control and the three reverse control gate control circuits are supplied with D.C. operating voltage from supply conductors 2 and 4 as in FIG. 1, and the neutral point of the secondary of transformer TR is connected through conductor 8 to common conductor 4. And an input signal for forward operation of the motor is connected from conductors 2 and 6 to gate control circuits 1—1, 1-2 and 1-3 as in FIG. 1, there being a zener diode ZD1 across forward input conductors 2 and 6 to limit the input voltage.

For reverse operation of the motor, a reverse input signal is applied from conductors 2 and 14 to gate control circuits 2-1, 2—2 and 2-3, there being a zener diode ZD3 across conductors 2 and 14 to limit the reverse input signal.

Since this half-wave system requires only a 90° control range in continuous current operation and never the full 180 degree control range in discontinuous current operations as indicated below curves (a) in FIG. 3, the ramp stretch used in FIG. 1 is not required in FIG. 4. Consequently, external terminals L and M are not jumpered on the six gate control circuits in FIG. 4 The resistor R6 (see FIG. 1) terminal L may be left disconnected or may instead be jumpered to common conductor 4 at external terminal E as shown in FIG. 4.

Also, to prevent excessive lag in the sync voltage in the half-wave reversing system of FIG. 4, sync calibrate terminals J and K are jumpered on all six gate control circuits. As will be apparent from the details in FIG. 1, this jumper shunts out resistor R4 in the RC circuit of capacitor C1 to reduce the lag of voltage $E_{c1}$ as shown in FIG. 5, curves (a), over that shown in FIG. 3, curves (b) as to FIG. 1.

Figure 5:
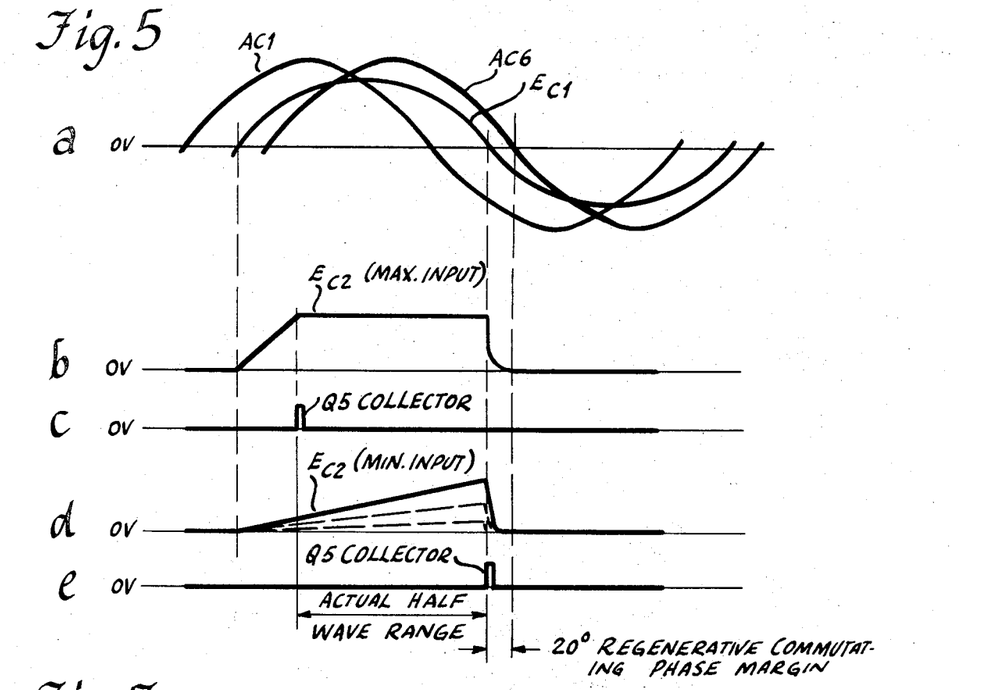
FIG. 5 is a group of curves showing operating characteristics of the half-wave reversing system of FIG. 4.

FIG. 5 shows operating characteristics of the half-wave reversing system of FIG. 4. As shown by curve (b), at maximum input signal, capacitor C2 starts charging as soon as sync voltage $E_{c1}$, curves (a), turns transistor Q2 off and charges quickly to provide a gate pulse as shown by curve (c). On the other hand, at maximum input signal, capacitor C2 charges slowly as shown by curve (d) and provides a gate pulse at the transistor Q5 collector as shown by curve (e). If the charging ramp does not reach zener triggering value as shown by the broken line ramps in curve (d), a marker pulse is generated when voltage $E_{c1}$ in curve (a) decreases to zero as hereinbefore described. The pulses in curves (c) and (e) define the operating range of the half-wave reversing system. As shown at the bottom of FIG. 5, this arrangement in the half-wave reversing system provides a 20° regenerative commutating phase margin affording time for the SCR's to commutate or turn off. This commutating phase margin is less than in the full-wave system hereinafter described since per unit line reactance is much less in the half-wave system as the half-wave system is generally applied to low power systems such as 75 HP maximum at 240 armature volts.

The third horizontal row in the table in FIG. 10 shows what connections are to be made in the gate control circuits in the half-wave reversing system of FIG. 4. The first column indicates that terminals L and E are connected by jumpers in circuits 1-3 and card 1 and circuits 1-3 of card 2. The second, third and fourth columns indicate the sync voltage connections for circuits 1-3 of both cards. The last column indicates that terminals J and K are connected by jumpers on circuits 1-3 of both printed circuit cards.

FULL-WAVE SYSTEM - FIG. 6

In the full-wave system of FIG. 6, reference characters like those in FIG. 4 have been used for similar elements.

There is shown a full-wave controlled rectifier system constructed in accordance with the invention and using six of the flexible gate control circuits hereinbefore described. Of these circuits, the three mounted on the first card are numbered 1—1, 1-2 and 1-3, while the three mounted on the second card are numbered 2-1, 2—2, 2-3. The gate control circuits are like those in FIG. 4 but these connections are different as hereinafter described.

In this full-wave system, power lines L1, L2 and L3, having a three-phase source connected thereto, are connected through SCR1, SCR2 and SCR3, respectively, to the positive side of load device LD which may be a D.C. motor. The negative side of the load device is connected through SCR4, SCR5 and SCR6 to power lines L1, L2 and L3, respectively. As can be seen, at least one SCR in the group SCR1-3 and at least one SCR in the group SCR4-6 must be gated at the same time to close an energizing path from the source to the load.

Transformer TR has its primary windings P1, P2 and P3 connected to lines L1, L2 and L3 as in FIGS. 1 and 4. The six secondary windings S1-6 have their common junction connected through conductor 8 to common conductor 4. Secondary windings S1-6 provide sync voltage phases AC1-6, respectively. As shown in FIG. 6, and indicated in the last horizontal double row of the table in FIG. 10, phases AC1-6 are connected to sync terminals 1A to 6A in gate control circuits 1—1, 1-2, 1-3, 2-1, 2-2 and 2-3, respectively.

All six of these gate control circuits are supplied with operating voltage from conductors 2 and 4, and receive an input signal voltage from conductor 6. As in FIGS. 1 and 4, zener diode ZD1 is connected from conductor 2 to conductor 6 to limit the input signal.

In this full-wave system, sync calibrate external terminals J and K are left unjumpered on all six gate control circuits. Also, ramp stretch external terminals L and M are left unjumpered and instead terminal L is connected to ground at external terminal E. This is because this full-wave drive requires only a 90° control range in continuous current operation and never requires the full 180° control range in discontinuous current operation as indicated just below curves (a) in FIG. 3. Consequently, there is no need for this ramp stretch jumper which effects stretch at both ends of the ramp.

In this full-wave system, only one sync phase is used for each gate control circuit, such as AC1 for circuit 1—1, and the pulse is "doubled." This full-wave system is insensitive to line phase rotation because only one sync phase is used for each gate pulse control circuit, instead of the intermediate phase of two sync phases, and the pulse is doubled. This means that as each gate control circuit gates or fires the associated "positive" SCR that closes a path from a power line to the load, this same gate control circuit also sends a pulse from its external "refire" terminal of the appropriately phased gate pulse control circuit simultaneously to fire the associated "negative" SCR into conduction.

For this purpose, as shown in FIG. 6 and indicated in the last horizontal double line of the table in FIG. 10, pulse terminal 1G of gate control circuit 1—1 is connected to refire terminal 5H of gate control circuit 2—2 of refire SCR5 at the same time as SCR1 is fired. In a similar manner, pulse terminal 2G is connected to refire terminal 6H to fire SCR6 at the same time as SCR2 is fired. Pulse terminal 4G is connected to refire terminal 2H to fire SCR2 at the same time as SCR4 is fired. Pulse terminal 5G is connected to refire terminal 3H to fire SCR3 at the same time as SCR5 is fired. And pulse terminal 6G is connected to refire terminal 1H to fire SCR1 at the same time as SCR6 is fired.

For this purpose, output terminals 1C and 1D of gate control circuit 1—1 are connected through gate transformer GT1 to the gate of SCR1. In a similar manner output terminals 2C and 2D of circuit 1-2 are connected through gate transformer GT2 to the gate of SCR2. Output terminals 3C and 3D of circuit 1-3 are connected through transformer GT3 to the gate of SCR3. Output terminals 4C and 4D of circuit 2-1 are connected through transformer GT4 to the gate of SCR4. Output terminals 5C and 5D of circuit 2—2 are connected through transformer GT5 to the gate of SCR5. And output terminals 6C and 6D of gate control circuit 2-3 are connected through transformer GT6 to the gate of SCR6.

With this arrangement, the power lines may be connected to the power source in any order and the system will operate in a similar manner. In other words, the full-wave system is insensitive to line phase rotation.

Figure 7:
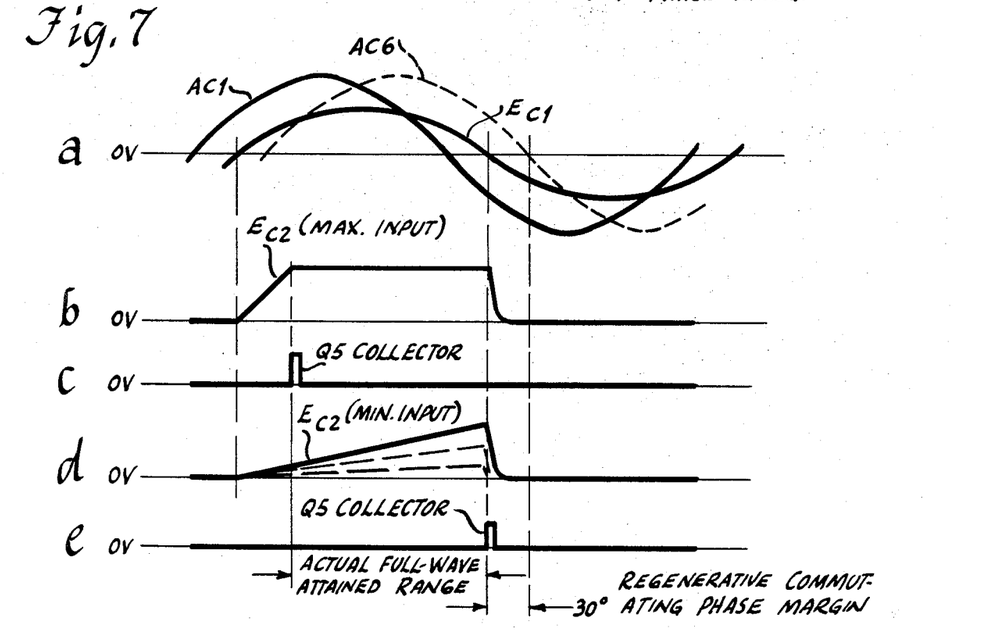
FIG. 7 is a group of curves showing operating characteristics of the full-wave system of FIG. 6.

The curves in FIG. 7 show operating characteristics of the full-wave system of FIG. 6. As shown by curves (a), sync voltage AC1 when applied to gate control circuit 1—1 develops a voltage $E_{c1}$ on capacitor C1. Curve (b) shows ramp voltage $E_{c2}$ on capacitor C2 for a maximum input signal value and curve (c) shows the resultant output pulse at the collector of transistor Q5. Reference should be had to FIG. 1 for details of the gate control circuit. Curve (d) shows ramp voltage $E_{c2}$ on capacitor C2 for the minimum input signal value and curve (e) shows the resultant output pulse at the collector of transistor Q5. The broken lines in curve (d) show ramp voltages for less than minimum control signal allowing the production of a marker pulse also depicted by curve (e). As shown below curve (e), pulses (c) and (e) delineate the actual full-wave attained range of phase shift for SCR firing pulse control. As shown at the bottom of FIG. 5, this full-wave system arrangement affords a 30° regenerative commutating phase margin affording time for the SCR's to commutate or turn off.

EXTERNAL RAMP STRETCH CIRCUIT - FIG. 8

Figures 8, 9:
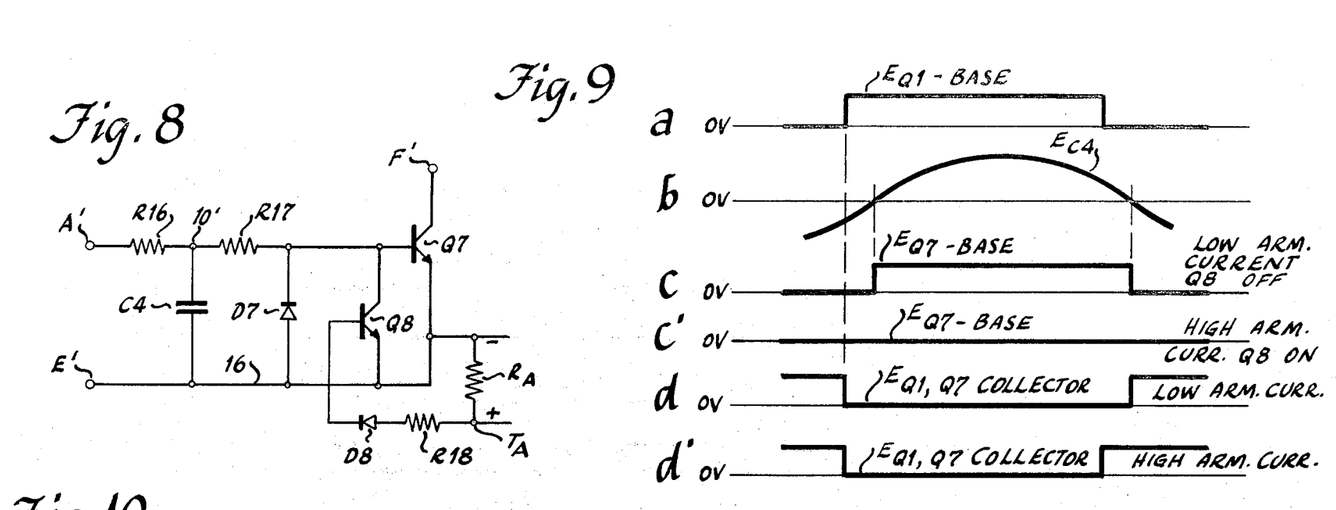
FIG. 8 is a circuit diagram of an external ramp stretch circuit usable with the half-wave and full-wave systems of FIGS. 4 and 6.
FIG. 9 is a group of curves showing operating characteristics of the external ramp stretch circuit of FIG. 8.

The external ramp stretch circuit shown in FIG. 8 may be used in the half-wave reversing system of FIG. 4 or the full-wave system of FIG. 6 to afford firing pulse phase control to a lower load current at high inverting load voltage. FIG. 8 shows both a ramp stretch circuit that includes transistor Q7 and a switching circuit that includes transistor Q8 whereby this ramp stretch circuit is rendered effective or ineffective in response to motor speed conditions as hereinafter described.

This external ramp stretch circuit is generally similar to the transistor Q1 ramp control circuit in FIG. 1 except that it has a longer time constant and is arranged to be connected in parallel therewith to shift the ramp toward the right. To this end, the collector of transistor Q7 in FIG. 8 is connected to terminal F' which is adapted to be connected to external terminal F' of a gate control circuit in FIG. 4 or FIG. 6, and the emitter thereof is connected to common conductor 16. This conductor 16 is connected to terminal E' which is adapted to be connected to terminal E in FIGS. 4 or 6 which is connected to the grounded common conductor 4 therein. Sync terminal A' is adapted to be connected to sync phase AC1 through external terminal 1A in FIGS. 4 to 6 to receive its sync voltage. In a similar manner, sync terminals A' of five other external ramp stretch circuits are adapted to be connected to sync phases AC2-6, respectively, and likewise as to terminals F' and E'.

As shown in FIG. 8, sync terminal A' is connected through a resistor R16 and a capacitor C4 to common conductor 16 to develop a phase-delayed voltage at junction 10' on the upper side of the capacitor. This phase-delayed voltage is applied through resistor R17 to the base of transistor Q7 to turn it on when the phase-delayed voltage goes positive. A diode D7 is connected from the emitter to the base of transistor Q7 to conduct current when the sync voltage is negative thereby to hold this transistor turned off.

Switching transistor Q8 has its collector and emitter connected to the base and emitter, respectively, of transistor Q7 to shunt the base-emitter junction of the latter when transistor Q8 is turned on. A motor armature circuit signal resistor $R_A$ is connected from terminal $T_A$ to common conductor 16 so that current proportional to motor armature current flowing therethrough produces a voltage drop therein that is plus at terminal $T_A$ and minus at common conductor 16. The plus end of this signal resistor is connected through a current limiting resistor R18 and a unidirectional diode D8 to the base of switching transistor Q8. Diode D8 blocks reverse current from the base-emitter junction of transistor Q8.

Since the external ramp stretch circuit of FIG. 8 has a longer RC time constant than the transistor Q1 base circuit, when connected in FIG. 4 or FIG. 6 system, it will cause the voltage at transistor Q1 collector to be stretched to the right.

While an external circuit such as shown in FIG. 8, when used, is connected to each one of the six gate control circuits in FIG. 4 or FIG. 6, the operation of the external circuit will be described in connection with gate control circuit 1—1 shown in detail in FIG. 1.

The external stretch circuit of FIG. 8 is arranged to operate only in the low motor current range. Transistor Q8 cuts it out in the high motor speed range. For this purpose, a current proportional to the motor armature current flows through signal resistor $R_A$. The voltage drop across resistor $R_A$ causes a current to flow through current limiting resistor R18, diode D8 and the base-emitter circuit of transistor Q8 to common conductor 16. At high motor current when the motor current in resistor $R_A$ is above a predetermined value, for example 25 percent of the full-load current, the current flowing into the base of transistor Q8 is large enough to turn this transistor on and shunt the input to transistor Q7 thereby to render the external stretch circuit ineffective. On the other hand, at low motor current when the current in resistor $R_A$ is below such predetermined value, the current flowing into the base of transistor Q8 is insufficient and this switching transistor turns off thereby rendering the external stretch circuit operable.

As hereinbefore described in connection with gate control circuit 1—1, when regenerating, a normal end of ramp time produces a "marker" pulse, if no gate pulse has been produced, to prevent commutation failure and resulting malfunction. This marker pulse insures that the SCR's always are fired during their cycle times. But at the same time, this marker pulse limits the ability to control the low armature currents in a high voltage regenerative mode. Since this condition of medium-to-low armature current is a safe condition further to retard gating and obtain still lower current, the external ramp stretch circuit is made operable whenever the armature current is at or below a safe medium-low level. The marker pulse is needed for 25 percent and above current but below 25 percent currents it is not needed. When the marker pulse is in effectiveness, and regenerative load voltage is high, it is not possible to get low armature current, for example less than 10 percent, so the marker pulse is further retarded by the ramp stretch. This retarding of the marker pulse is attained since it is not normally generated until the end of the ramp.

The curves in FIG. 9 provide a graphic illustration of the operating characteristics of the external ramp stretch circuit of FIG. 8. A description of operation of one external ramp stretch circuit will suffice since the six external ramp stretch circuits used in the half-wave reversing system of FIG. 4 or the full-wave system of FIG. 6 are alike except for the phasing of the sync voltages connected thereto.

Thus, curve (a) in FIG. 9 shows the voltage at the base of transistor Q1. For details of the circuit of transistor Q1, reference may be had to FIG. 1. This curve is the same as curve (b) in FIG. 2 hereinbefore described.

The next curve (b) in FIG. 9 shows the voltage of capacitor C4 appearing at junction 10' in FIG. 8. Sync voltage phase AC1 is applied to terminal A' and due to the longer RC time constant of the circuit in FIG. 8, the phase of voltage $E_{c4}$ is delayed by the amount shown by this curve.

The next curve (c) shows the voltage at the base of transistor Q7 for the low armature current condition when transistor Q8 is turned off.

Curve (d) in FIG. 9 shows the combined transistors Q1 and Q7 collector voltage. It will be seen from this curve that when the external ramp stretch circuit is in use, transistor Q1 first turns transistor Q2 off to start the capacitor C2 charging ramp the same as shown in FIGS. 5 and 7. However, thereafter transistor Q7 turns on according to curve (c) in FIG. 9. Now, when transistor Q1 normally turns off according to curve (a) in FIG. 9, transistor Q7 remains turned on for the stretched period according to curve (c) in FIG. 9. Thus, the ramp is stretched at its trailing end for purposes hereinbefore described.

Curve (c') in FIG. 9 shows the base voltage of transistor Q7 in FIG. 8 for the high armature current condition when switching transistor Q8 is turned on. As is apparent, this voltage stays at near zero value since the switching transistor shunts it to the common conductor, thus rendering the external ramp stretch circuit ineffective when it is not needed.

Curve (d) shows the combined collector voltages of transistor Q1 and Q7 for the high armature current condition illustrated also by curve (c'). As will be apparent, this curve depicts no ramp stretch.

While the systems hereinbefore described are effectively adapted to fulfill the objects stated, it is to be understood that the invention is not intended to be confined to the particular preferred embodiments of controlled rectifier systems and flexible gate pulse control circuits therefor disclosed, inasmuch as they are susceptible of various modifications without departing from the scope of the appended claims.

I claim:

1. A plural-phase controlled rectifier system comprising: a rectifier network having controlled rectifiers in predetermined branches thereof and power supply lines connectable to a plural-phase A.C. power source and adapted to energize a D.C. load device:
   each controlled rectifier having an anode-cathode path for conducting current between the source and load device and a gate terminal whereby it is fired into conduction;
   a plurality of like, flexible, gate control circuits, one for each controlled rectifier branch of said network, for applying firing pulses to the gates of the controlled rectifiers in the respective branches in controlled phase and sequence during their positive anode voltage periods;
   a plural-phase transformer supplied from said power supply lines for applying A.C. signals to said gate control circuits to synchronize the gate pulses with the positive anode voltage periods of the controlled rectifiers in the respective branches within a predetermined gate control range thereby to render the system insensitive to line phase rotation;
   input means in said flexible gate control circuits responsive to a control signal for controlling the phase angle of said gate pulses within said range;
   and said gate control circuits including means making them flexible comprising;
   means adapting said gate control circuits for selectively generating their gate pulses in the correct time relationship ranges of a variety of different controlled rectifier networks having line phase rotation insensitivity;
   and said adapting means comprising a plurality of external terminals facilitating the making of selective external connections whereby to convert the same to generating their gate pulses in the correct time relationship range for a selected one of said variety of different controlled rectifier networks.

2. The invention defined in claim 1, wherein each said gate control circuit comprises:
   control signal integration means whereby the control signal shapes the ramp and a pulse is generated after a fixed energy accumulation.

3. The invention defined in claim 1 wherein said gate control circuits comprise:
   ramp voltage developing phase shift circuits;
   gate pulse developing circuits responsive to said ramp voltages reaching a predetermined value;
   and sync circuits including means responsive to said A.C. signals for developing A.C. sync signals and switching means responsive to said synch signals for rendering said ramp voltage developing means effective within said correct time relationship range and ineffective at the end thereof.

4. The invention defined in claim 3, wherein:
   each sync circuit comprises ramp voltage stretch means for advancing the effective point and retarding the ineffective point of said ramp voltage developing means thereby to extend the gate pulse phase angle range at both ends of said range;
   and said plurality of external terminals comprises a pair of terminals adapted to receive a jumper to render said ramp voltage stretch means operable.

5. The invention defined in claim 4, wherein:
   said switching means comprises a transistor operable when turned on by a positive-going part of said A.C. sync signal for rendering said ramp voltage developing means effective;
   and said ramp voltage stretch means comprises means for applying a bias to said transistor to cause it to be turned on sooner by said A.C. sync signal and to be turned off later.

6. The invention defined in claim 3, wherein said means responsive to said A.C. signals for developing A.C. sync signals comprises:
   an RC circuit responsive to one A.C. signal from said transformer for developing a phase-shifted A.C. sync signal for the respective gate control circuit.

7. The invention defined in claim 3, wherein said means responsive to said A.C. signals for developing A.C. sync signals comprises:
   a branched resistor circuit responsive to pairs of phasedisplaced A.C. signals from said transformer for developing intermediate-phase A.C. sync signals for the respective gate control circuits;
   and a series resistor-capacitor circuit connected to said branched resistor circuit for shifting the phase of said A.C. sync signals.

8. The invention defined in claim 3, wherein said plurality of external terminals comprises:
   a pair of external terminals effective when jumpered to shunt the resistor of said resistor-capacitor circuit thereby to calibrate the A.C. sync signal.

9. The invention defined in claim 3, wherein:
   said plurality of external terminals comprises a pulse terminal and a refire terminal on each gate control circuit;
   means connecting said gate pulse developing circuit to said pulse terminal to send out a pulse therefrom each time said gate pulse developing circuit is operated;

gate pulse output means in each gate control circuit responsive to operation of the respective gate pulse developing circuit for firing the associated controlled rectifier;

means connecting said refire terminal to the respective gate pulse output means;

and a jumper connecting the pulse terminal of each gate control circuit to the refire terminal of another gate control circuit to cause simultaneous firing of the controlled rectifiers of pairs thereof associated with pairs of power lines in an orderly sequence.

10. The invention defined in claim 6, together with:

an external ramp voltage stretch circuit like said sync circuit but having a longer RC time constant in its RC circuit for developing an A.C. sync signal of greater phase delay;

said external ramp voltage stretch circuit being connectable in parallel with said sync circuit through said external terminals and being effective to allow the ramp voltage to develop further at its trailing end thereby to adapt the system for low current control at high inverting load voltages.

11. A three-phase controlled rectifier system comprising:

a rectifier network having SCR's in the branches thereof and three power supply lines adapted to be connected to a three-phase A.C. source and adapted to energize a D.C. motor;

each SCR having an anode-cathode path for conducting current between the source and the motor and a control gate whereby it is fired into conduction;

a plurality of like, flexible gate control circuits, one for each SCR branch of said network, for applying firing pulses to the control gates of the SCR's in the respective branches in controlled phase and sequence during their positive anode voltage periods;

a transformer having three primary windings connected to the power supply lines and six secondary windings connected to external terminals of said gate control circuits for providing three phases of positive and negative voltages thereto;

said gate control circuits having means developing A.C. sync signals in response to said secondary voltages to synchronize the gate pulses with the positive anode voltage periods of the respective SCR's within a predetermined gate control range to render the system insensitive to line phase rotation;

input control means in each gate control circuit responsive to an input signal for controlling the phase angle of the corresponding gate pulses within their range;

and said gate control circuits including means making them flexible comprising:

means adapting said gate control circuits for selectively generating their gate pulses in the correct time relationship range of any one of a variety of different three-phase rectifier systems;

and said adapting means comprising a plurality of like external terminals on each gate control circuit affording selective external connections for converting the same to generating the gate pulses in the correct time relationship range for the selected rectifier system.

* * * * *